US010718553B2

(12) United States Patent
Douven et al.

(10) Patent No.: US 10,718,553 B2
(45) Date of Patent: Jul. 21, 2020

(54) REFRIGERATION AND HEATING SYSTEM

(71) Applicants: Carrier Corporation, Farmington, CT (US); Christian Douven, Erkrath (DE)

(72) Inventors: Christian Douven, Erkrath (DE); Markus Hafkemeyer, Bonn (DE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 188 days.

(21) Appl. No.: 15/547,605

(22) PCT Filed: Feb. 9, 2015

(86) PCT No.: PCT/EP2015/052619
§ 371 (c)(1),
(2) Date: Jul. 31, 2017

(87) PCT Pub. No.: WO2016/128016
PCT Pub. Date: Aug. 18, 2016

(65) Prior Publication Data
US 2018/0023867 A1  Jan. 25, 2018

(51) Int. Cl.
*F25B 25/00* (2006.01)
*F25B 6/04* (2006.01)
(Continued)

(52) U.S. Cl.
CPC .............. *F25B 25/005* (2013.01); *F25B 6/04* (2013.01); *F25B 9/008* (2013.01); *F25B 29/003* (2013.01);
(Continued)

(58) Field of Classification Search
CPC .................. F25B 25/005; F25B 2400/04; F25B 2400/06; F25B 2600/2501; F25B 9/008;
(Continued)

(56) References Cited

U.S. PATENT DOCUMENTS

| 6,598,659 | B1 * | 7/2003 | Frulla | ................. | B22D 17/2218 |
| | | | | | 164/155.6 |
| 2011/0146313 | A1 * | 6/2011 | Finckh | .................... | F25B 9/008 |
| | | | | | 62/186 |
| 2016/0231040 | A1 * | 8/2016 | Hellmann | ............... | F25B 43/00 |

FOREIGN PATENT DOCUMENTS

| DE | 102008028178 A1 | 12/2009 |
| WO | 03064193 A1 | 8/2003 |

(Continued)

OTHER PUBLICATIONS

International Search Report and Written Opinion for application PCT/EP2015/052619, dated Oct. 12, 2015, 12pgs.

*Primary Examiner* — Ana M Vazquez
(74) *Attorney, Agent, or Firm* — Cantor Colburn LLP

(57) ABSTRACT

A refrigeration and heating system includes a refrigeration circuit which includes in the direction of flow of a circulating refrigerant: at least one compressor; a refrigeration circuit side of a coupling heat exchanger; at least one gas cooler; at least one gas cooler bypass line and at least one gas cooler bypass valve assembly allowing to bypass the at least one gas cooler; at least one expansion device and at least one evaporator. The refrigeration and heating system includes a heating circuit which includes in the direction of flow of a circulating heating fluid: a heating circuit side of the coupling heat exchanger and at least one heating device.

15 Claims, 7 Drawing Sheets

(51) Int. Cl.
*F25B 9/00* (2006.01)
*F25B 29/00* (2006.01)

(52) U.S. Cl.
CPC ..... *F25B 2339/047* (2013.01); *F25B 2400/04* (2013.01); *F25B 2400/06* (2013.01); *F25B 2400/13* (2013.01); *F25B 2600/2501* (2013.01)

(58) Field of Classification Search
CPC .............. F25B 29/003; F25B 2339/047; F25B 2400/13
See application file for complete search history.

(56) References Cited

FOREIGN PATENT DOCUMENTS

| | | | |
|---|---|---|---|
| WO | 2010003590 | A2 | 1/2010 |
| WO | 2013174379 | A1 | 11/2013 |
| WO | WO-2013174379 | A1 * | 11/2013 ................ F25B 1/10 |

* cited by examiner

REFRIGERATION AND HEATING SYSTEM

BACKGROUND OF THE INVENTION

In order to increase the efficiency of a refrigeration system by recovering heat rejected by the refrigeration system combined refrigeration and heating systems are provided in which the heat generated by the refrigeration system is not rejected as waste heat to the environment but delivered to a heating system to be used for heating a building and/or service water etc.

At high ambient temperatures, e.g. during summer, only a comparatively low heating capacity is needed. As a result, a situation may occur in which not enough heat is consumed by the heating system in order to sufficiently cool the refrigerant circulating within the refrigeration system. In order to handle this situation, a gas cooler is activated for further cooling down the refrigerant. However, when the gas cooler is active, approximately ⅓ of the heat cannot be used but is rejected as waste heat to the environment.

It therefore would be beneficial to provide an improved refrigeration and heating system and a method of operating such a system allowing to use the heat generated by the refrigeration system more efficiently even at relatively high ambient temperatures.

DISCLOSURE OF THE INVENTION

A refrigeration and heating system according to an exemplary embodiment of the invention comprises a refrigeration circuit and a heating circuit coupled to each other by a coupling heat exchanger which is configured for transferring heat from the circulating refrigerant to the circulating heating fluid. The refrigeration circuit comprises in the direction of flow of a circulating refrigerant: at least one compressor; a refrigeration circuit side of a coupling heat exchanger; at least one gas cooler; at least one expansion device; and at least one evaporator. The heating circuit comprises in the direction of flow of a circulating heating fluid: a heating circuit side of the coupling heat exchanger and at least one heating device/heat consumer. The refrigeration circuit additionally comprises a gas-cooler bypass line and a gas cooler bypass valve assembly which is configured for allowing to selectively direct a first flow of refrigerant either through the gas cooler or through the gas cooler bypass line bypassing the gas cooler and to gradually or continuously regulate a second flow of refrigerant flowing through the other of the gas cooler and the gas cooler bypass line for mixing with the first flow of refrigerant downstream of the gas cooler.

A method of operating a refrigeration and heating system according to an exemplary embodiment of the invention comprises the steps of circulating a refrigerant through the refrigeration circuit and circulating a heating fluid through the heating circuit, the heating circuit and the refrigeration circuit being thermally coupled by means of a coupling heat exchanger allowing heat to transfer from the refrigeration circuit to the heating circuit. The method further includes the steps of selectively directing a first flow of refrigerant either through the gas cooler or through the gas cooler bypass line bypassing the gas cooler and to gradually or continuously regulate a second flow of refrigerant flowing through the other of the gas cooler and the gas cooler bypass line for mixing with the first flow of refrigerant downstream of the gas cooler.

According to exemplary embodiments of the invention the refrigerant, which in particular comprises $CO_2$, is operated transcritically. In transcritical operation, at warmer ambient conditions, the pressure of the refrigerant is so high that only one phase is present and the pressure and the temperature can be adjusted individually.

By selectively mixing a first flow of refrigerant, which has passed the gas cooler, with a second flow refrigerant, which has bypassed the gas cooler, the temperature range, in which the refrigeration and heating system may be operated with high efficiency, can be extended. It is in particular possible to reduce the temperature of the refrigerant to a reasonable limit (of approx. 32° C.) while still most of the heat capacity is used for heating. As a result, the refrigeration and heating system can run stable at higher water inlet temperatures of the coupling heat exchanger without loosing too much heat to ambient air. Thus, more energy can be used for heating. This allows to run the whole system with high energy efficiency even if the heating system is not operated close to the point of operation it has been designed for.

SHORT DESCRIPTION OF THE FIGURES

In the following, exemplary embodiments of the invention will be described in more detail with reference to the enclosed figures:

FIG. 1a shows a refrigeration and heating system according to a first embodiment of the invention.

FIG. 1b shows a refrigeration and heating system according to a second embodiment of the invention.

FIG. 2a shows a refrigeration and heating system according to a third embodiment of the invention.

FIG. 2b shows a refrigeration and heating system according to a fourth embodiment of the invention.

FIG. 3a shows a refrigeration and heating system according to a fifth embodiment of the invention.

FIG. 3b shows a refrigeration and heating system according to a sixth embodiment of the invention.

FIGS. 4a and 4b schematically illustrate the operation of a prior art refrigeration and heating system.

FIG. 5 schematically illustrates the operation a refrigeration and heating system according to an embodiment of the invention.

Figure 1A:
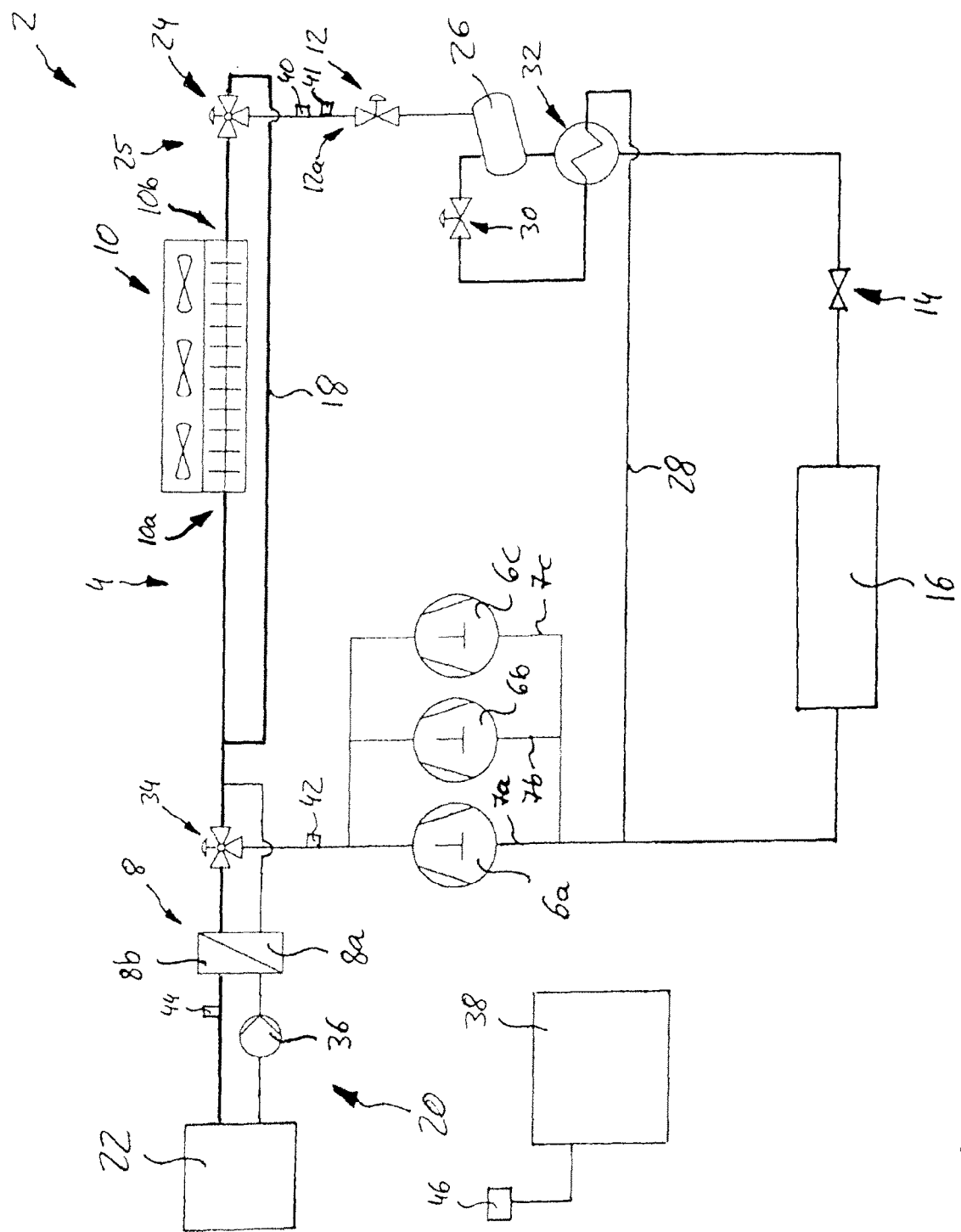
FIG. 1a shows a schematic view of a refrigeration and heating system 2 according to an exemplary embodiment of the invention.

The refrigeration and heating system 2 comprises a refrigeration circuit 4 and a heating circuit 20 thermally coupled to each other by a coupling heat exchanger 8, which is configured for transferring heat from the refrigeration circuit 4 to the heating circuit 20.

The refrigeration circuit 4 in particular comprises in the direction of flow of a circulating refrigerant: a plurality of compressors 6a, 6b, 6c fluidly connected in parallel for compressing and circulating the refrigerant through the refrigeration circuit 4; a coupling heat exchanger bypass valve 34, which may be an adjustable valve and which allows to selectively direct the flow of refrigerant leaving the compressors 6a, 6b, 6c either to a refrigeration circuit side 8a of a coupling heat exchanger 8, which couples the refrigeration circuit 4 to the heating circuit 20, or to bypass said coupling heat exchanger 8 in order to direct the flow of refrigerant leaving the plurality of compressors 6a, 6b, 6c directly to the inlet side 10a of at least one gas cooler 10, which is fluidly connected to the outlet side of the coupling heat exchanger 8.

The outlet side 10b of the at least one gas cooler 10 is connected via a gas cooler bypass valve assembly 25 comprising a gas cooler bypass valve 24, which will be described in more detail further below, to the inlet side 12a of a high pressure expansion device 12, which acts as a high pressure control device and is configured for expanding the refrigerant from the high pressure generated by the compressors 6a, 6b, 6c to a lower medium pressure, before it enters into a receiver 26, which is configured for separating gas phase refrigerant collecting at the top of the receiver 26 from liquid refrigerant, collecting at the bottom of the receiver 26. The bottom of the receiver is fluidly connected to a medium pressure expansion device 14 and an evaporator 16 fluidly connected downstream of the medium pressure expansion device 14 for evaporating the expanded refrigerant thereby absorbing heat from the environment and providing the desired cooling capacity.

The compressors 6a, 6b, 6c may be individually switched on and off for allowing to vary their combined performance. Optionally, at least one of the compressors 6a, 6b, 6c may be provided as a variable speed compressor 6a which allows to continuously vary its performance in order to adjust the capacity provided by the compressors 6a, 6b, 6c even more precisely.

An optional flash gas line 28 comprising a flash gas valve 30, which acts as a medium pressure control device, and an optional heat exchanger 32, which is configured for allowing heat exchange between the flash gas flowing through the flash gas line 28 and the liquid refrigerant leaving the bottom of the receiver 26, fluidly connects an upper portion of the receiver 26 to inlet lines 7a, 7b, 7c of the compressors 6a, 6b, 6c allowing flash gas to selectively exit from the top of the receiver and to flow to the inlet lines 7a, 7b, 7c of the compressors 6a, 6b, 6c. Selectively delivering flash gas from the receiver 26 to the inlet lines 7a, 7b, 7c of the compressors 6a, 6b, 6c allows to adjust the pressure within the receiver 26.

The heating circuit 20 comprises in the direction of flow of a circulating heating fluid a heating circuit side 8b of the coupling heat exchanger 8, which is in thermal connection with the refrigerant circuit side 8a of the coupling heat exchanger 8 allowing the transfer of heat from the refrigerant circulating with refrigeration circuit 4 to the heating fluid circulating within the heating circuit 20, and at least one heating device 22 for consuming the transferred heat, e.g. for heating water and/or (parts of) a building. At least one heating fluid pump 36 may be provided in the heating circuit 20 for supporting the circulation of the heating fluid.

A gas cooler bypass line 18 connects between the inlet side 10a of the gas cooler 10 and the gas cooler bypass valve assembly 25, which is provided by the gas cooler bypass valve 24 and arranged between the outlet side 10b of the gas cooler 10 and the high pressure expansion device 12. In the embodiment shown in FIG. 1a the gas cooler bypass valve 24 is a three-way mixing valve 24, which is configured for selectively allowing to mix refrigerant, which has flown through the gas cooler 10, with refrigerant, which has bypassed the gas cooler 10 via the gas-cooler bypass line 18 and to deliver a mixture of said refrigerant portions having a mixing temperature to the high pressure expansion device 12.

Figure 1B:
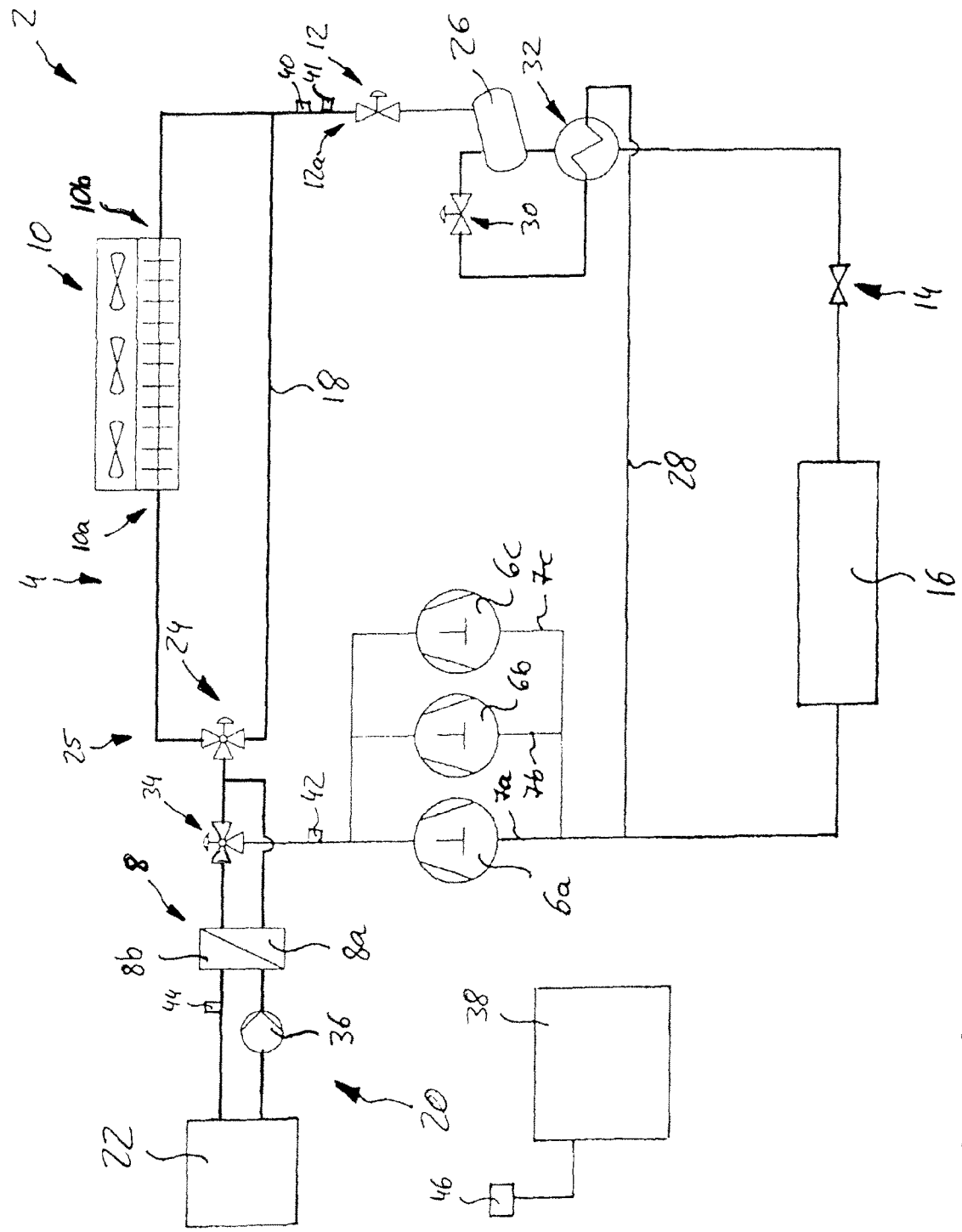

FIG. 1b shows a refrigeration and heating system according to a second embodiment of the invention which is similar to the first embodiment shown in FIG. 1a, but in which the gas cooler bypass valve assembly 25 comprising the gas cooler bypass valve 24 is arranged upstream the gas cooler 10.

Figure 2A:
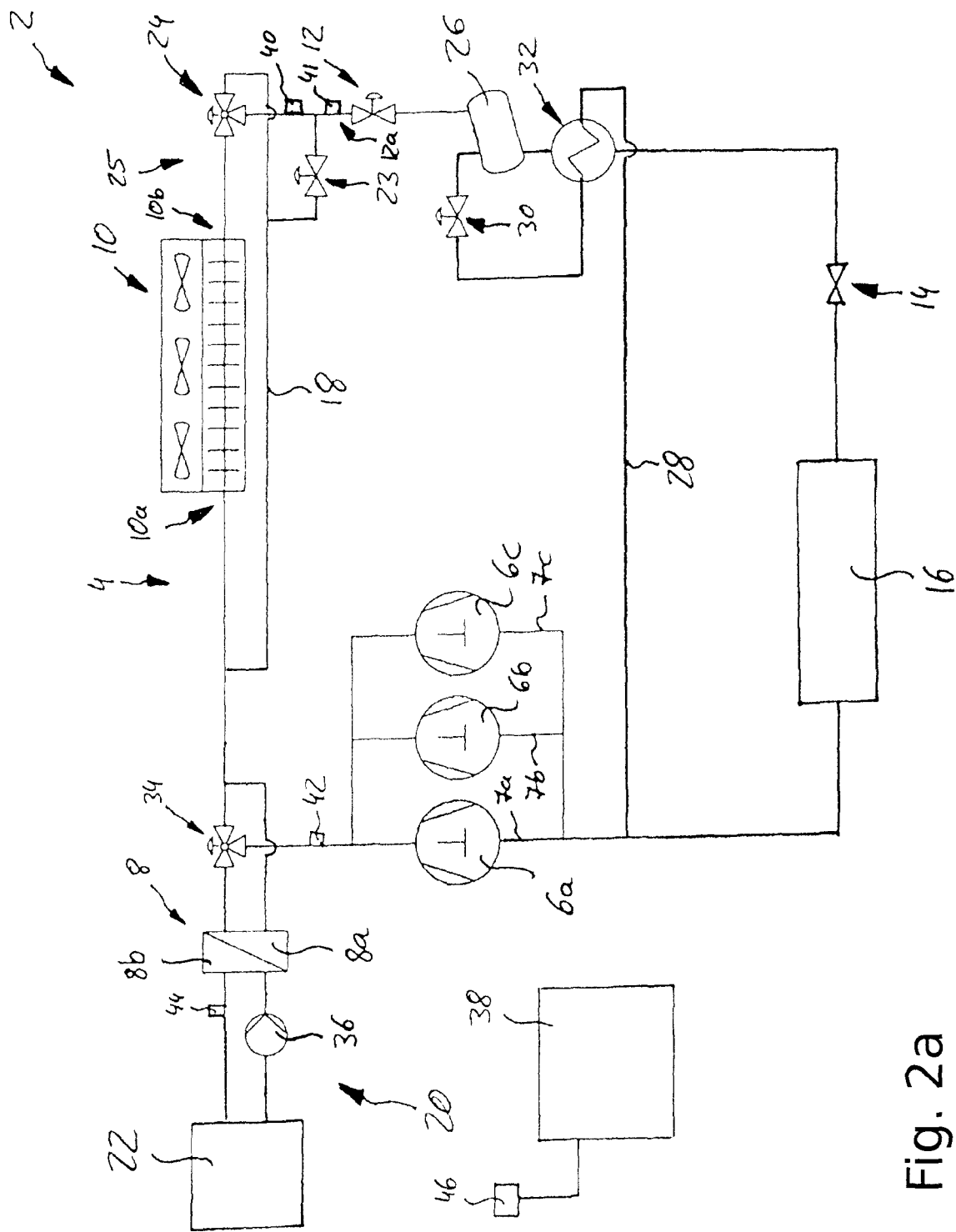

FIG. 2a shows a refrigeration and heating system according to a third embodiment of the invention.

The components of said third embodiment, which are identical with the components of the first embodiment shown in FIG. 1a are denoted by the same reference signs and will not be discussed in detail again.

Contrary to the first and second embodiments, the gas cooler bypass valve 24 of the third embodiment is not provided as a mixing valve but as a digital three-way switching valve, allowing to fluidly connect the inlet side 12a of the high pressure expansion device 12 either to the outlet side 10b of the gas cooler 10 or to the gas-cooler bypass line 18. Thus, depending on the position of the gas cooler bypass valve 24 either refrigerant, which has flown through the gas cooler 10, or refrigerant, which has bypassed the gas cooler 10 via the gas-cooler bypass line 18 is delivered through the gas cooler bypass valve 24 to the high pressure expansion device 12.

In said third embodiment the gas cooler bypass valve assembly 25 additionally comprises an adjustable two-way valve 23 connecting between the bypass line 18 and the inlet side 12a of the high-pressure expansion device 12 in order to allow mixing refrigerant from the gas cooler bypass line 18 with the refrigerant which has been delivered from the gas cooler bypass valve 24. Thus, by (a) switching the gas cooler bypass valve 24 into a position, in which it allows refrigerant to flow from the gas cooler 10 to the high-pressure expansion device 12 and blocks any flow of refrigerant from the gas cooler bypass line 18 to the high-pressure expansion device 12, and (b) selectively opening the adjustable valve 23 for mixing refrigerant from the gas cooler bypass line 18 to the refrigerant being delivered from the gas cooler 10 via the gas cooler bypass valve 24, a mixture of refrigerant, which has flown through the gas cooler 10, with refrigerant, which has bypassed the gas cooler 10 via the gas-cooler bypass line 18 may be delivered to the high-pressure expansion device 12.

Thus, the combination of the adjustable valve 23 and the gas cooler bypass valve 24 provides the same functionality as the three-way mixing valve, which is used as the gas cooler bypass valve 24 according to the first and second embodiments shown in FIGS. 1a and 1b. In the third embodiment according to FIG. 2a, an additional valve 23 is needed, but the use of an expensive three-way mixing valve can be avoided.

Figure 2B:
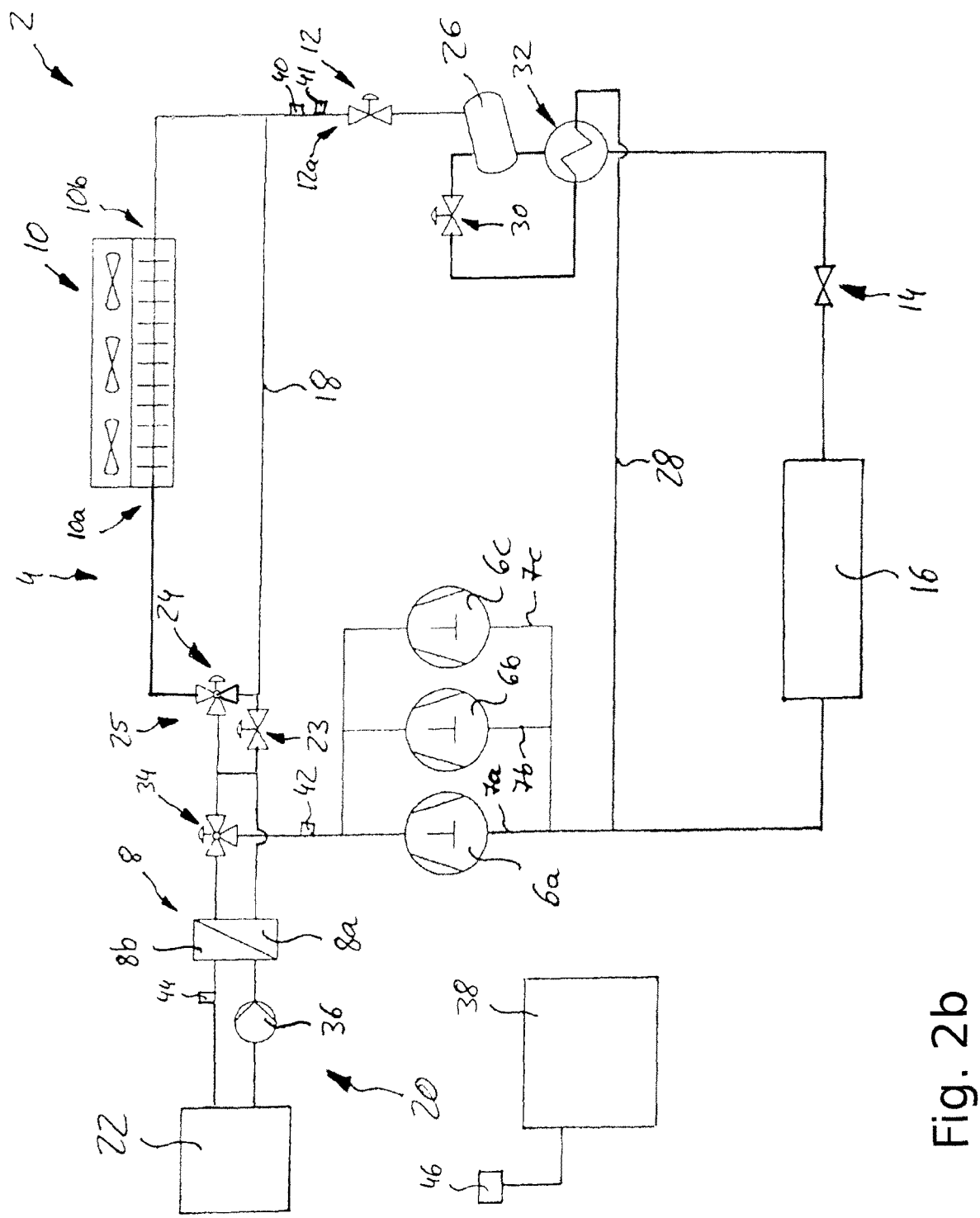

FIG. 2b shows a refrigeration and heating system according to a fourth embodiment of the invention which is similar to the third embodiment shown in FIG. 2a, but in which the gas cooler bypass valve assembly 25 comprising the gas cooler bypass valve 24 and the additional adjustable valve 23 is arranged upstream the gas cooler 10. In this fourth embodiment the adjustable valve 23 fluidly connects the refrigeration circuit side 8a of a coupling heat exchanger 8 to the gas-cooler bypass line 18 allowing to bypass the gas cooler bypass valve 24.

Figure 3A:
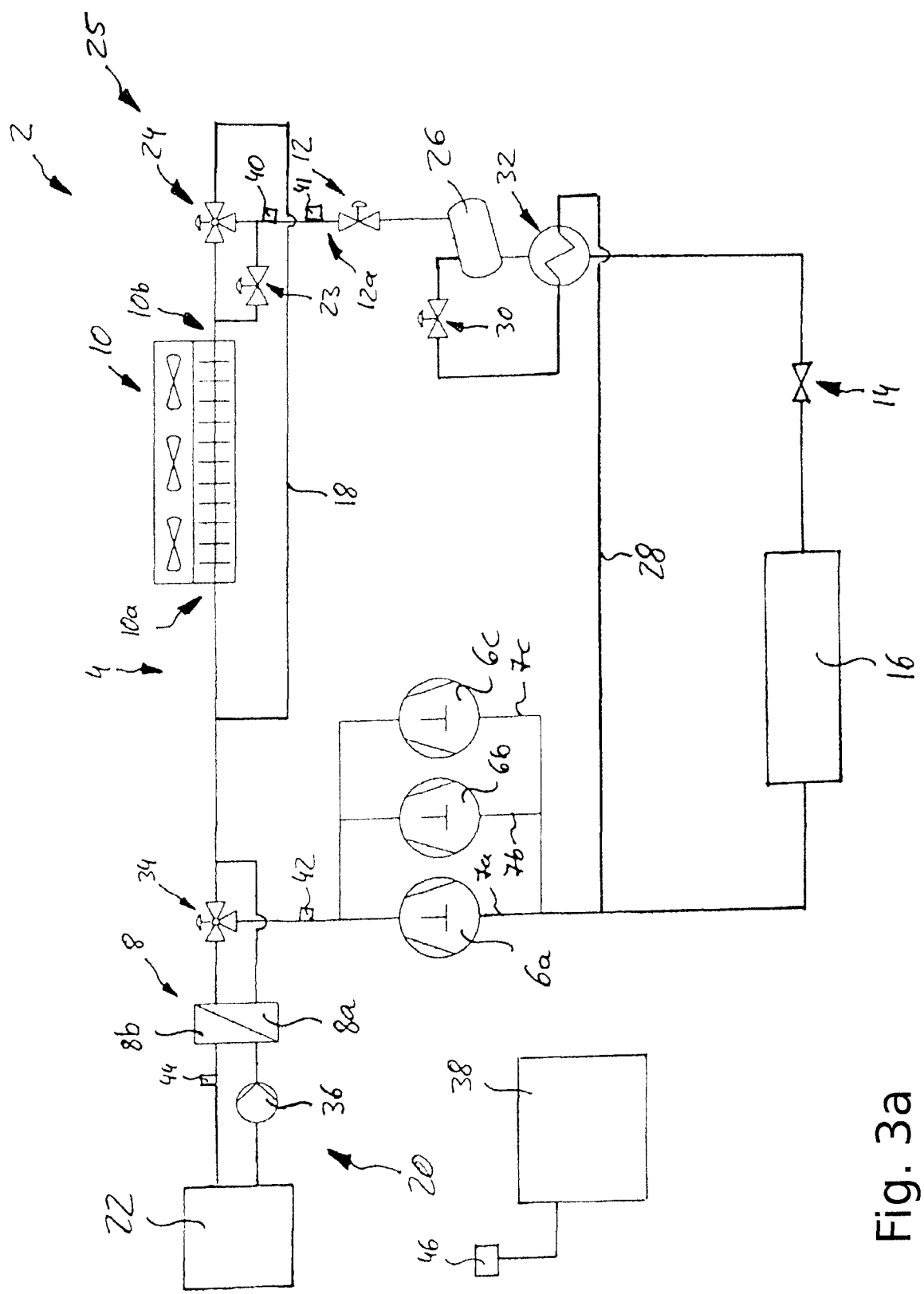

FIG. 3a shows a refrigeration and heating system according to a fifth embodiment of the invention, which is similar to the third embodiment shown in FIG. 2a. Again, the components of said fifth embodiment, which are identical with the components of the first and third embodiments shown in FIGS. 1a and 2a, respectively, are denoted by the same reference signs and will not be discussed in detail again.

Similar to the third embodiment the gas cooler bypass valve 24 of the fifth embodiment is provided as a digital switching valve allowing to fluidly connect the inlet side 12a of the high pressure expansion device 12 either to the 10b of the gas cooler 10 or to the gas-cooler bypass line 18, but not providing any mixing functionality.

According to the fifth embodiment, the gas cooler bypass valve assembly 25 comprises an adjustable two-way valve 23 connecting between the outlet side 10b of the gas cooler 10 and the outlet of the gas cooler bypass valve 24, which is fluidly connected to the inlet side 12a of the high-pressure expansion device 12.

Thus, by (a) switching the gas cooler bypass valve 24 into a position, in which it allows refrigerant to flow from the gas cooler bypass line 18 to the high-pressure expansion device 12 and blocks any flow of refrigerant from the gas cooler 10 to the high-pressure expansion device 12, and (b) selectively opening the adjustable valve 23 for mixing refrigerant from the gas cooler 10 to the refrigerant being delivered from the gas cooler bypass line 18 via the gas cooler bypass valve 24, a mixture of refrigerant, which has flown through the gas cooler 10, and refrigerant, which has bypassed the gas cooler 10 via the gas-cooler bypass line 18 may be delivered to the high-pressure expansion device similar to the third embodiment shown in FIG. 2a.

Thus, similar to the third embodiment, the combination of the adjustable valve 23 and the gas cooler bypass valve 24 provides the same functionality as the three-way mixing valve, which is used as the gas cooler bypass valve 24 in the first and second embodiments shown in FIGS. 1a and 1b. As in the third embodiment, an additional valve 23 is needed in the fifth embodiment, but again the use of an expensive three-way mixing valve can be avoided.

Figure 3B:
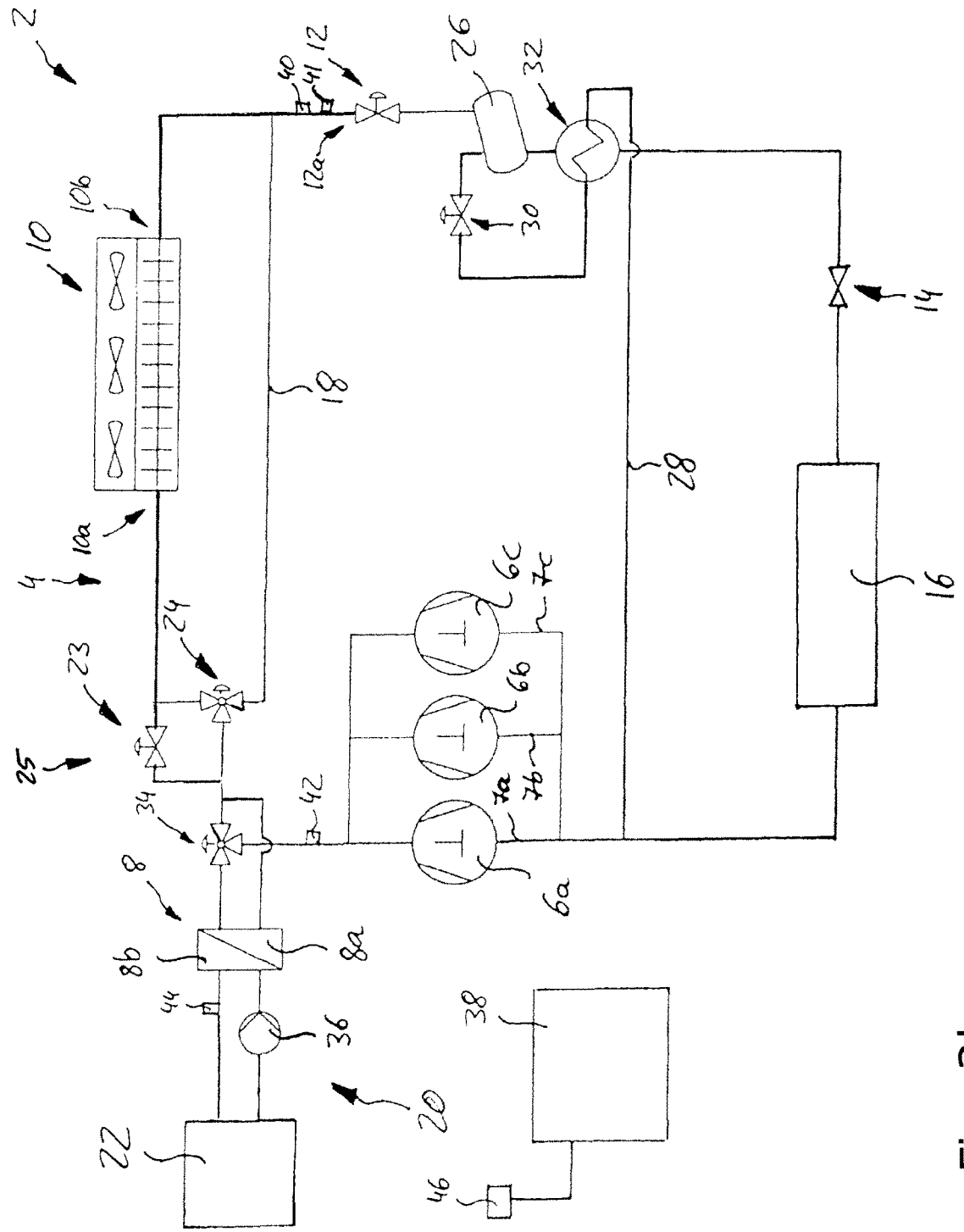

FIG. 3b shows a refrigeration and heating system according to a sixth embodiment of the invention which is similar to the fifth embodiment shown in FIG. 3a, but in which the gas cooler bypass valve assembly 25 comprising the gas cooler bypass valve 24 and the adjustable valve 23 is arranged upstream the gas cooler 10. In this sixth embodiment the adjustable valve 23 fluidly connects the refrigeration circuit side 8a of a coupling heat exchanger 8 to the gas-cooler's 10 inlet side 10a allowing to bypass the gas cooler bypass valve 24.

In all embodiments the refrigeration and heating system 2 further comprises a control unit 38 which is configured for controlling the operation of the compressors 6a, 6b, 6c, the gas cooler bypass valve 24, the coupling heat exchanger bypass valve 34, the high pressure control valve 12 and the adjustable two-way valve 23, if present, in order to provide the desired cooling and heating capacities. The control unit 38 may be configured for controlling the compressors 6a, 6b, 6c and valves 12, 23, 24, 34 by means of electrical wires, which are not shown in the figures for reasons of clarity, or by means of a wireless connection including WLAN, "Bluetooth" or the like.

In order to enable the control unit 38 to control the compressors 6a, 6b, 6c and valves 12, 23, 24, 34 appropriately, at least one of a refrigerant pressure sensor 40, refrigerant temperature sensors 41, 42, a heating fluid temperature sensor 44 and an ambient air temperature sensor 46 are provided, allowing the control unit 38 to control the compressors 6a, 6b, 6c and valves 12, 24, 34 based on the temperatures and/or pressures measured by said sensor(s) 40, 42, 44, 46. The refrigerant pressure sensor 40 and a refrigerant temperature sensor 41 are in particular located between the gas cooler 10 and the high pressure expansion device 12.

Figure 4A:
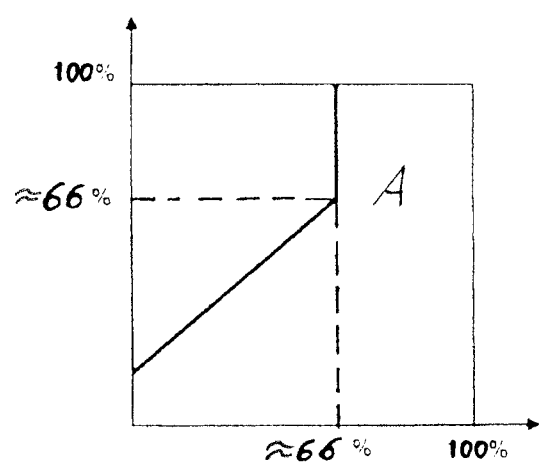
Figure 4B:
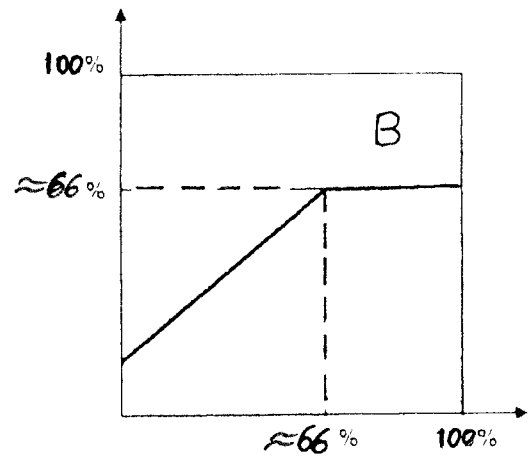

FIGS. 4a and 4b schematically illustrate the relation between the heat demand of the heating device 22, e.g. a building to be heated, which is plotted on the horizontal axis, and the heat provided by the $CO_2$ refrigeration circuit 2 operated in the transcritical mode, which is plotted on the vertical axis, for different heating fluid return temperatures, in particular for a heating fluid return temperature of 30° C. in FIG. 4a and a heating fluid return temperature of 35° C. in FIG. 4b. The refrigerant circulating within the refrigeration circuit 2 in particular comprises $CO_2$ and is operated transcritically. In transcritical operation, at warmer ambient conditions, the pressure of the refrigerant is so high that only one phase is present and the pressure and the temperature can be adjusted individually.

In FIG. 4a the return temperature and herewith the $CO_2$ outlet temperature allows to bypass the gascooler 10 with acceptable efficiency of the refrigeration process. In FIG. 4b bypassing the gascooler 10 is prohibited due to too high fluid return temperatures and herewith too high $CO_2$ outlet temperatures, which results in an unacceptable efficiency of the $CO_2$ refrigeration process.

The solid line drawn in these diagrams separates the operation mode in which the gas cooler 10 is used for additionally cooling the refrigerant (upper left portion of the respective diagram) from the operation mode in which the gas cooler 10 is bypassed and all the heat from the refrigerant is transferred to the heating circuit 20 (lower right portion of the respective diagram).

FIG. 4a illustrates that at a relatively low heating fluid return temperature of up to approx. 30° C. 100% of the heat provided by the refrigeration circuit 4 may be used for heating; however, in this case the refrigeration circuit 4 is not capable to completely meet very high heating demands in the area A located in the most right portion of FIG. 4a and it is to modulate the heating capacity provided by the refrigeration circle.

At a higher heating fluid return temperature of e.g. 35° C., according to FIG. 4b, the refrigeration circuit 4 is capable to meet the heating demands of the heating system up to 100%; however in this case not all the heat provided by the refrigeration circuit 4 can be used for heating and gascooler bypass operation is prohibited in order to keep an acceptable level of efficiency for the refrigeration cycle. Even when the heating demand is at its maximum (at the right side of the diagram), approx. 33% of the heat provided by the refrigeration circuit 4 are delivered to the environment by means of the gas cooler 10 (according to the area B in the upper portion of FIG. 4b), which reduces the efficiency of the heating system 2 considerably.

Figure 5:
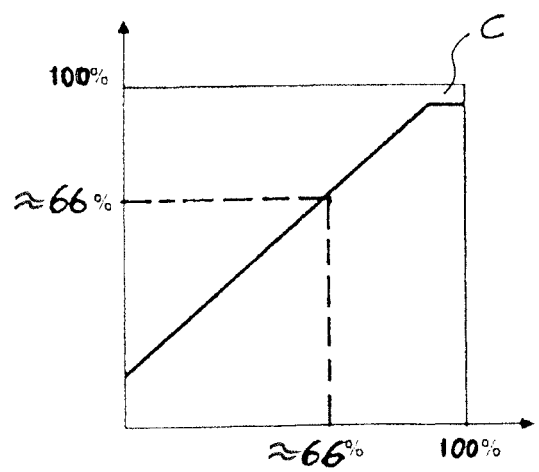

FIG. 5, in contrast, shows the operation of a refrigeration and heating system 2 according to an exemplary embodiment of the invention at higher heating fluid return temperature of e.g. 35° C. By selectively mixing refrigerant flowing through the gas cooler 10 with refrigerant bypassing the gas cooler 10 the amount of waste heat, i.e. heat provided by the refrigeration circuit 4 which cannot be used by the heating circuit 20 and is rejected by the gas cooler 10, may be considerably reduced (see the relatively small area C at the right upper corner of the diagram). Thus, selectively mixing cold refrigerant flowing through the gas cooler 10 with warm refrigerant bypassing the gas cooler 10 considerably enhances the efficiency of the refrigeration and heating system 2 in particular at high heating fluid return temperatures.

FURTHER EMBODIMENTS

In an embodiment the gas cooler bypass valve assembly is located downstream or upstream of the gas cooler.

In an embodiment the gas cooler bypass valve assembly comprises an adjustable three-way-valve providing a compact configuration allowing to mix refrigerant from the gas cooler with refrigerant from the gas cooler bypass line using only a single valve.

In an alternative embodiment the gas cooler bypass valve assembly comprises a digital three-way-valve and an adjustable two-way valve which is connected in a configuration allowing to by-pass the three-way-valve. In this configuration, the need for a complicated and expansive adjustable three-way-valve, which is capable of providing a mixing functionality, can be avoided.

The adjustable two-way valve may be connected either between the outlet of the gas cooler bypass line and the outlet of the digital three-way-valve or between the outlet of the gas cooler and the outlet of the digital three-way-valve allowing to either regulate the flow of refrigerant from the gas cooler bypass line or the flow of refrigerant from the gas cooler, respectively.

The adjustable two-way valve may also be connected either between the inlet of the digital three-way-valve and the inlet of the gas cooler bypass line or between the inlet of the digital three-way-valve and the inlet of the gas cooler.

In an embodiment a refrigerant receiver, which is configured for separating gas phase refrigerant from liquid phase refrigerant and storing said refrigerant, is provided downstream of the gas cooler. The separation of gas phase refrigerant from liquid phase refrigerant allows to deliver only liquid refrigerant to the expansion device provided upstream of the evaporator enhancing the efficiency of the refrigeration circuit.

In an embodiment a high pressure expansion device is provided upstream of the refrigerant receiver.

In an embodiment a flash gas line fluidly connects an upper portion of the refrigerant receiver with an inlet line of the at least one compressor allowing flash gas, which collects at the top of the receiver, to flow from the receiver directly to the inlet of the compressor(s) bypassing the medium expansion device(s) and the evaporator(s). This will help to improve the efficiency of the refrigeration circuit, as the flash gas does not contribute to the cooling capacity of the evaporator(s).

A flash gas valve provided in the flash gas line allows to control and regulate the flow of flash gas through the flash gas line and to adjust the pressure within the receiver.

In an embodiment an additional flash gas heat exchanger allowing heat exchange between the flash gas flowing through the flash gas line and refrigerant leaving from the bottom of the receiver is provided. Such heat exchange between the flash gas and the liquid refrigerant contributes to improving the efficiency of the refrigeration circuit as well.

In an embodiment the refrigeration and heating system further comprises a control unit which is configured for controlling the at least one compressor and/or the gas cooler bypass valve. The control unit in particular may comprise a microcomputer running an appropriate program for controlling the operation of the refrigeration and heating system.

In an embodiment the refrigeration and heating system further comprises at least one of a refrigerant pressure sensor, a refrigerant temperature sensor, a heating fluid temperature sensor and an ambient air temperature sensor functionally connected to the control unit for allowing the control unit to control the compressors and/or the gas cooler bypass valve assembly based on the measured temperatures and/or pressures in order to optimally adjust the operation of the refrigeration and heating system.

In an embodiment the refrigerant comprises carbon dioxide, which provides an efficient, inflammable, non-toxic and environmentally acceptable refrigerant. The heating fluid in particular may include water, which may in particular comprise an anti-corrosive additive.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the dependent claims.

REFERENCES 2 refrigeration and heating system
4 refrigeration circuit
6a, 6b, 6c at least one compressor
7a, 7b, 7c compressor inlet lines
8 coupling heat exchanger
8a refrigeration circuit side of the heat exchanger
8b heating circuit side of the heat exchanger
10 gas cooler
10a inlet side of the gas cooler
10b outlet side of the gas cooler
12 high pressure expansion device/high pressure control device
12a inlet side of the high pressure expansion device
14 medium pressure expansion device
16 evaporator
18 gas cooler bypass line
20 heating circuit
22 heating device
23 adjustable (two-way) bypass valve
24 gas cooler bypass valve
25 gas cooler bypass valve assembly
26 refrigerant receiver
28 flash gas line
30 flash gas valve/medium pressure control device
32 flash gas heat exchanger
34 heat exchanger bypass valve
36 heating fluid pump
38 control unit
40 refrigerant pressure sensor
41, 42 refrigerant temperature sensor
44 heating fluid temperature sensor
46 ambient air temperature sensor

The invention claimed is:
1. Refrigeration and heating system comprising:
a refrigeration circuit which comprises in a direction of flow of a circulating refrigerant:
at least one compressor;
a refrigeration circuit side (Sa) of a coupling heat exchanger;
at least one gas cooler;
at least one gas cooler bypass line and at least one gas cooler bypass valve assembly allowing to bypass the at least one gas cooler;
at least one expansion device; and
at least one evaporator; and
a heating circuit which comprises in a direction of flow of a circulating heating fluid:
a heating circuit side of the coupling heat exchanger; and
at least one heating device;

wherein the coupling heat exchanger is configured for transferring heat from the circulating refrigerant to the circulating heating fluid; and wherein the gas cooler bypass valve assembly is configured for allowing to selectively direct a first flow of refrigerant either through the gas cooler or through the gas cooler bypass line bypassing the gas cooler and to gradually regulate a second flow of refrigerant flowing through the other of the gas cooler and the gas cooler bypass line which mixes with the first flow downstream of the gas cooler.

2. Refrigeration and heating system of claim 1, wherein the gas cooler bypass valve assembly is located downstream of the gas cooler.

3. Refrigeration and heating system of claim 1, wherein the gas cooler bypass valve assembly comprises a gradually adjustable three-way gas cooler bypass valve.

4. Refrigeration and heating system of claim 1, wherein the gas cooler bypass valve assembly comprises a digital three-way gas cooler bypass valve and an adjustable bypass valve allowing to by-pass the digital three-way gas cooler bypass valve.

5. Refrigeration and heating system of claim 4, wherein the adjustable bypass valve is connected between an outlet of the gas cooler and an outlet of the digital three-way gas cooler bypass valve.

6. Refrigeration and heating system of claim 4, wherein the adjustable bypass valve is connected between an outlet of the gas cooler bypass line and an outlet of the digital three-way bypass valve.

7. Refrigeration and heating system of claim 1, further comprising a receiver downstream of the gas cooler.

8. Refrigeration and heating system of claim 7, further comprising a high pressure expansion device upstream of the receiver.

9. Refrigeration and heating system of claim 7, further comprising a flash gas line connecting an upper portion of the receiver with an inlet site of the at least one compressor.

10. Refrigeration and heating system of claim 9 further comprising a flash gas valve provided in the flash gas line.

11. Refrigeration and heating system of claim 9, further comprising a flash gas heat exchanger allowing heat exchange between a flash gas and the refrigerant leaving from the bottom of the receiver.

12. Refrigeration and heating system of claim 1, further comprising a control unit, which is configured for controlling the at least one compressor and/or the gas cooler bypass valve assembly.

13. Refrigeration and heating system of claim 12, further comprising at least one of a refrigerant pressure sensor, a refrigerant temperature sensor, a heating fluid temperature sensor and an ambient air temperature sensor in order to allow the control unit to control the compressors and/or the gas cooler bypass valve assembly based on the measured temperatures and/or pressures.

14. Refrigeration and heating system of claim 1, wherein the refrigerant comprises carbon dioxide.

15. Method of operating a refrigeration and heating system comprising:
circulating a refrigerant through a refrigeration circuit which comprises in a direction of flow of the circulating refrigerant:
at least one compressor;
a refrigeration circuit side (Sa) of a coupling heat exchanger;
at least one gas cooler;
at least one gas cooler bypass-line;
at least one expansion device; and at least one evaporator;
circulating a heating fluid through a heating circuit which comprises in a direction of flow of the circulating heating fluid:
a heating circuit side of the coupling heat exchanger; and
at least one heating device;
wherein the coupling heat exchanger is configured for transferring heat from the circulating refrigerant to the circulating heating fluid; and
the method further includes selectively directing a first flow of refrigerant either through the gas cooler or through the gas cooler bypass line bypassing the gas cooler and of gradually regulating a second flow of refrigerant flowing through the other of the gas cooler and the gas cooler bypass line, wherein said second flow mixes with the first flow downstream of the gas cooler.

* * * * *